United States Patent
Swilik, Jr. et al.

(10) Patent No.: US 6,502,909 B1
(45) Date of Patent: Jan. 7, 2003

(54) MEDIA FILTER CABINET FOR GAS FURNACE

(75) Inventors: Robert C. Swilik, Jr., Indianapolis, IN (US); Robert A. Lang, II, Indianapolis, IN (US); Rex Mills, Indianapolis, IN (US); Paul M. Haydock, Zionsville, IN (US)

(73) Assignee: Carrier Corporation, Farmington, CT (US)

( * ) Notice: Subject to any disclaimer, the term of this patent is extended or adjusted under 35 U.S.C. 154(b) by 98 days.

(21) Appl. No.: 09/696,677

(22) Filed: Oct. 25, 2000

(51) Int. Cl.[7] ............................................... A47B 47/00
(52) U.S. Cl. ..................... 312/263; 312/257.1; 55/481; 55/496
(58) Field of Search ............................... 312/257.1, 263, 312/265.1, 265.2, 265.3, 265.4, 265.5, 265.6; 55/481, 496, 503, 506, 511, 495

(56) References Cited

U.S. PATENT DOCUMENTS

| 3,432,999 A | * | 3/1969 | Ernst-Schraner | 55/496 X |
| 3,494,113 A | * | 2/1970 | Kinney | 55/481 |
| 3,523,409 A | * | 8/1970 | Paterson | 55/481 X |
| 3,626,669 A | * | 12/1971 | Cardiff | 55/481 X |
| 3,789,589 A | * | 2/1974 | Delany et al. | 55/481 |
| 4,171,150 A | * | 10/1979 | Soderlund | 312/265.5 X |
| 5,071,455 A | * | 12/1991 | Abedi-Asi | |
| 5,458,667 A | * | 10/1995 | Poggi, et al. | 55/481 X |
| 5,641,342 A | * | 6/1997 | Smith et al. | 55/481 X |
| 5,788,729 A | * | 8/1998 | Jurgensmeyer | 55/496 |
| 6,059,966 A | * | 5/2000 | Brandhofer et al. | 55/496 X |
| 6,099,612 A | * | 8/2000 | Bartos | 55/481 |
| 6,264,713 B1 | * | 7/2001 | Lewis, II | 55/481 |

FOREIGN PATENT DOCUMENTS

| GB | 2116069 | * | 9/1983 |
| GB | 2211110 | * | 6/1989 |

* cited by examiner

Primary Examiner—Lanna Mai
Assistant Examiner—Hanh V. Tran
(74) Attorney, Agent, or Firm—Wall Marjama & Bilinski LLP (57) ABSTRACT

A media filter cabinet for a gas furnace is sized to accept a high-efficiency media filter while being easily adaptable to accept a standard size filter. A perforated duct flange on one side of the cabinet permits ease of installation since the flange can be bent at 90 or 180 degrees along the perforations, or removed, depending on the type of duct the cabinet is installed with. The cabinet is adapted to fit a standard filter by using a removable bracket and a wire to retain the standard filter within the cabinet. With the removal of a front door and a back side of the cabinet, the cabinet collapses to diminish its shipping size. In one embodiment, the cabinet is in kit form which is easily assembled.

12 Claims, 11 Drawing Sheets

MEDIA FILTER CABINET FOR GAS FURNACE

FIELD OF THE INVENTION

This invention relates to the field of gas furnaces, and in particular, to a media filter cabinet used in a furnace.

BACKGROUND OF THE INVENTION

Many commercially made and custom made filter cabinets are available as accessories for hot air gas furnaces. Some furnaces come with built-in filter cabinets. Up until recently, all filters were of the standard ~1" wide size. With increases in filter technology, wider filters have become commercially available with filters of up to 5" wide. Such wide high-efficiency type air filters are known as "media" filters because they use a variety of filtering media instead of just one filtering medium to filter the air passing through them. Once a filter cabinet of a particular size is installed, there is no way of reconfiguring the filter cabinet to take a different size filter. A need therefore exists for a filter cabinet which can accept or be easily modified to accept different size filters.

SUMMARY OF THE INVENTION

Briefly stated, a media filter cabinet for a gas furnace is sized to accept a high-efficiency media filter while being easily adaptable to accept a standard size filter. A perforated duct flange on one side of the cabinet permits ease of installation since the flange can be bent at 90 or 180 degrees along the perforations, or removed, depending on the type of duct the cabinet is installed with. The cabinet is adapted to fit a standard filter by using a removable bracket and a wire to retain the standard filter within the cabinet. With the removal of a front door and a back side of the cabinet, the cabinet collapses to diminish its shipping size. In one embodiment, the cabinet is in kit form which is easily assembled.

According to an embodiment of the invention, a media filter cabinet for a furnace includes a bottom side connected at a first end to a back side which in turn is connected to a top side; first and second front supports connecting a second end of the bottom side to the top side; a door removably connected across the two front supports; a right side connecting to the top side, the bottom side, the back side, and the first front support; a left side connecting to the top side, the bottom side, the back side, and the second front support; the right side having an opening therein defined by a perforated duct flange; the left side having an opening therein; retaining means for retaining a standard size filter in the cabinet; a width of the cabinet being sized to fit a high-efficiency media filter; and a distance between the retaining means and the left side of the cabinet being sized to fit a standard filter.

According to an embodiment of the invention, a media filter cabinet kit includes a front piece, the front piece including a plurality of slots and a plurality of tabs; a top piece, the top piece including a plurality of slots and a plurality of tabs, wherein the plurality of tabs of the top piece are fittable within the plurality of slots in the front piece and the plurality of tabs in the front piece are fittable within the plurality of slots in the top piece; a back piece, the back piece including a plurality of slots and a plurality of tabs, wherein the plurality of tabs of the back piece are fittable within the plurality of slots in the front piece and the plurality of tabs in the front piece are fittable within the plurality of slots in the back piece; and a bottom piece, the bottom piece including a plurality of slots and a plurality of tabs, wherein the plurality of tabs of the bottom piece are fittable within the plurality of slots in the front piece and the back piece, and the plurality of tabs in the front and back pieces are fittable within the plurality of slots in the bottom piece.

DETAILED DESCRIPTION OF THE PREFERRED EMBODIMENT

Figure 1:
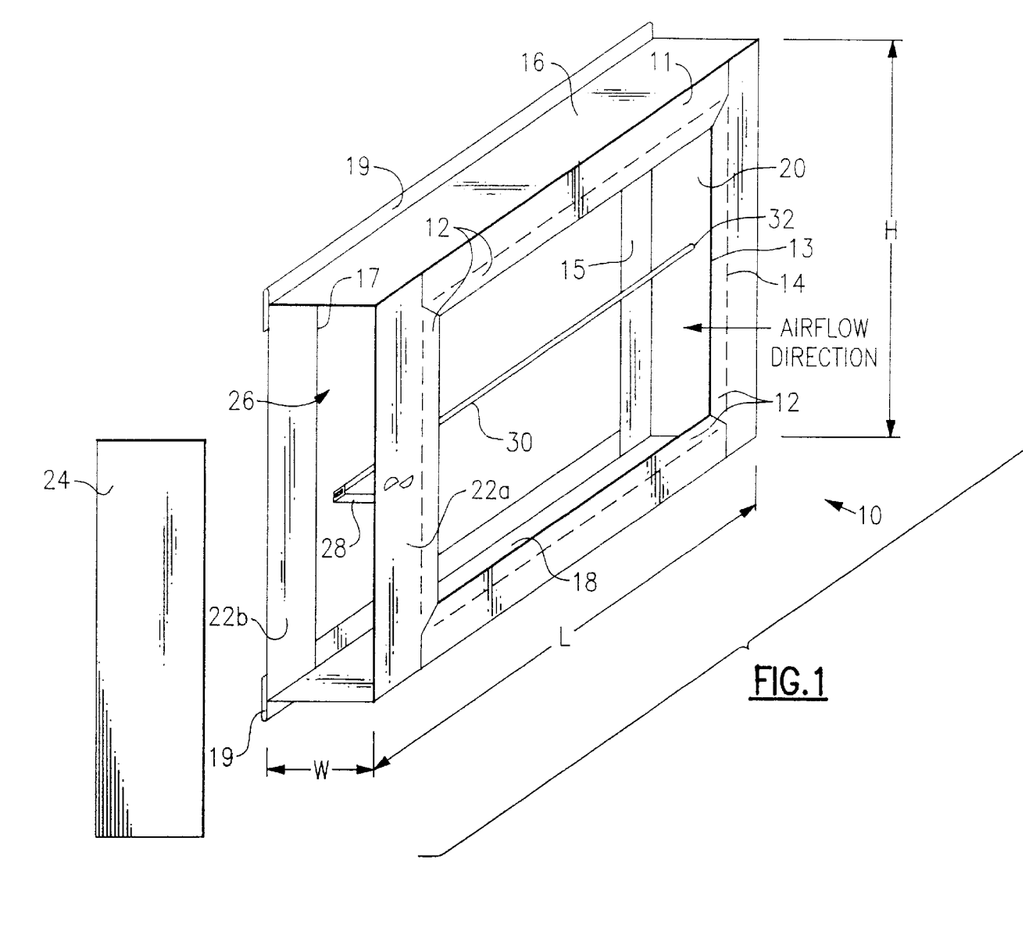
FIG. 1 shows a perspective view of a media filter cabinet according to an embodiment of the present invention.

Referring to FIG. 1, a filter media cabinet 10 is shaped to exactly fit to various furnace casing widths and accommodate side air return. In the drawing, cabinet 10 is shown with a rectangular shape. A right side 11 of cabinet 10 contains an opening 13 defined by a duct flange 12 which preferably contains a plurality of perforations 14 to allow ease of bending duct flange 12 during field installation. Flanges 12 can be bent at a 90 degree angle to the supply direction for connecting to take-off ducts that extend in parallel to the direction of the airflow. Flanges 12 can also be bent at a 180 degree angle to allow the flanges 12 to be used instead of special "S" clips typically used to secure drop ducts. Finally, flanges 12 can be easily removed by cutting along perforations 14 for the cases where flanges are not needed.

An opening 17 is defined by a left side 15 of cabinet 10. Top and bottom portions of left side 15 preferably include a 180° folded flange 19 to aid in connecting cabinet 10 to the furnace or ductwork. Folded flange 19 also adds strength to media cabinet 10. The air flow direction is indicated by the arrow, passing through opening 13, the filter (not shown), and opening 17 in that order. Cabinet 10 further includes a top side 16, a bottom side 18, a back side 20, and two front supports 22a, 22b. Back side 20 optionally is a separate piece and removable from cabinet 10. A door 24 fits over the edges of front supports 22a, 22b. Cabinet 10 is hollow, thus defining a media cavity 26. A width W of cabinet 10 is approximately 5" so as to contain a 5" media filter. A length L and a height H are determined so that openings 13 and 17 accommodate the air return duct.

A stand-off bracket 28 is removably attached to front support 22a. With bracket 28 removed and door 24 and back side 20 removed from cabinet 10, cabinet 10 can be flattened along diagonally opposite seams, i.e, top right and bottom left or top left and bottom right, to present a small package for shipping. A wire 30 runs through media cavity 26 from a hole 32 in back side 20 to stand-off bracket 28.

Bracket 28 is approximately 4" long and hole 32 is an equal distance from right side 11, so that when installed, wire 30 acts as a retaining wire for a 1" filter. Bracket 28 and wire 30 are not installed, or uninstalled, to accommodate a 4.5"–5" media filter. As is discussed with respect to FIG. 2 below, bracket 28 is easily removable to convert cabinet 10 to replace a 1" filter with a 5" media filter. Bracket 28 optionally is available in different sizes so that filter sizes between 1" and 5" can be accommodated.

Figure 2:
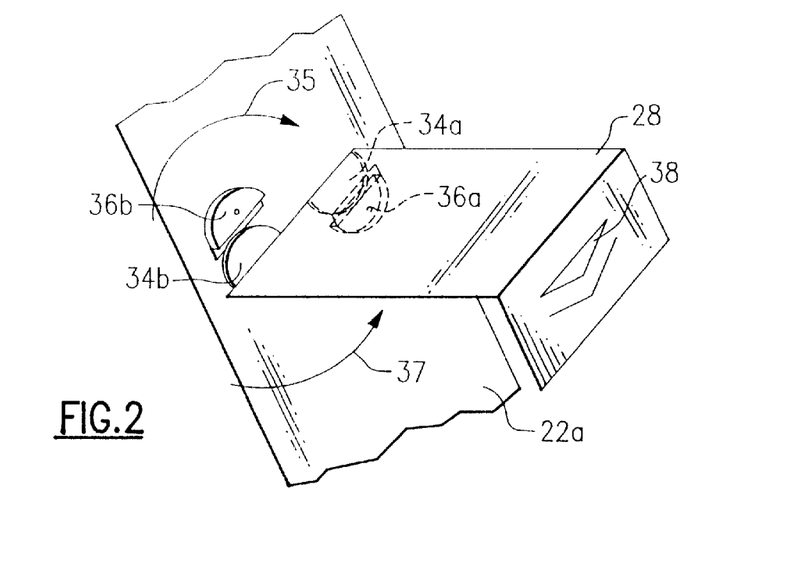
FIG. 2 shows a perspective view of a bracket used in the embodiment of FIG. 1.

Referring to FIG. 2, stand-off bracket 28 preferably includes flanges 34a, 34b which extend from a first end of stand-off bracket 28. Flange 34a extends in a direction 180° away from flange 34b, and both flanges 34a, 34b are perpendicular to a main portion of stand-off bracket 28. Front support 22a preferably includes receptacles 36a, 36b. Receptacles 36a, 36b are sized and shaped so that flanges 34a, 34b of stand-off bracket 28 fit into them when stand-off bracket 28 is installed. Stand-off bracket 28 is installed by first placing the first end against front support 22a so that flanges 34a, 34b rest flat against the surface of front support 22a and then rotating stand-off bracket 28 in a direction shown by arrow 35 until flanges 34a, 34b securely engage receptacles 36a, 36b. Stand-off bracket 28 is removed by rotating in a direction shown by arrow 37. An angled portion at a second end of stand-off bracket 28 includes a hole or slot 38 for easy field installation of wire 30 (FIG. 1).

Figure 3A:
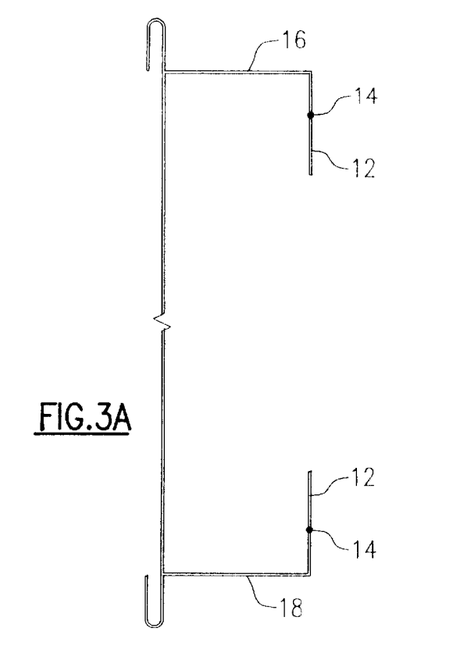
FIG. 3A shows a partial sectional view of a flange configuration of the media cabinet of FIG. 1 received by an installer.
Figure 3B:
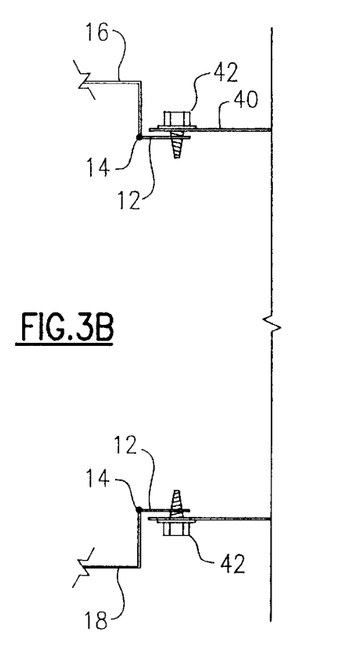
FIG. 3B shows a partial sectional view of a flange configuration of the media cabinet of FIG. 1 connecting to a take-off duct.
Figure 3C:
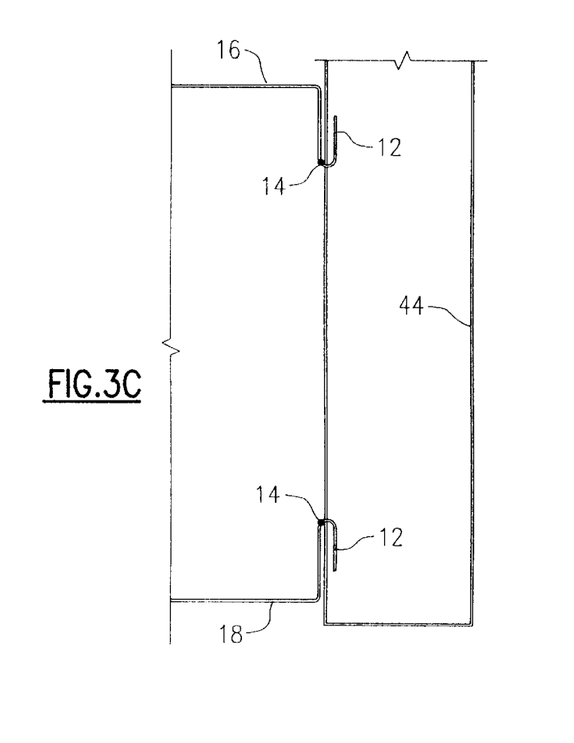
FIG. 3C shows a partial sectional view of a flange configuration of the media cabinet of FIG. 1 for connecting to a drop duct.

Referring to FIGS. 3A–3C, a partial sectional view of duct flange 12 and perforations 14 is shown in FIG. 3A as filter media cabinet 10 is received by the installer. In FIG. 3B, flange 12 is bent at a 90 degree angle along perforations 14 for fastening to a take-off duct 40 via connecters such as mounting screws 42. In FIG. 3C, flange 12 is bent back 180 degrees along perforations 14 for use with a drop duct 44.

Figure 4:
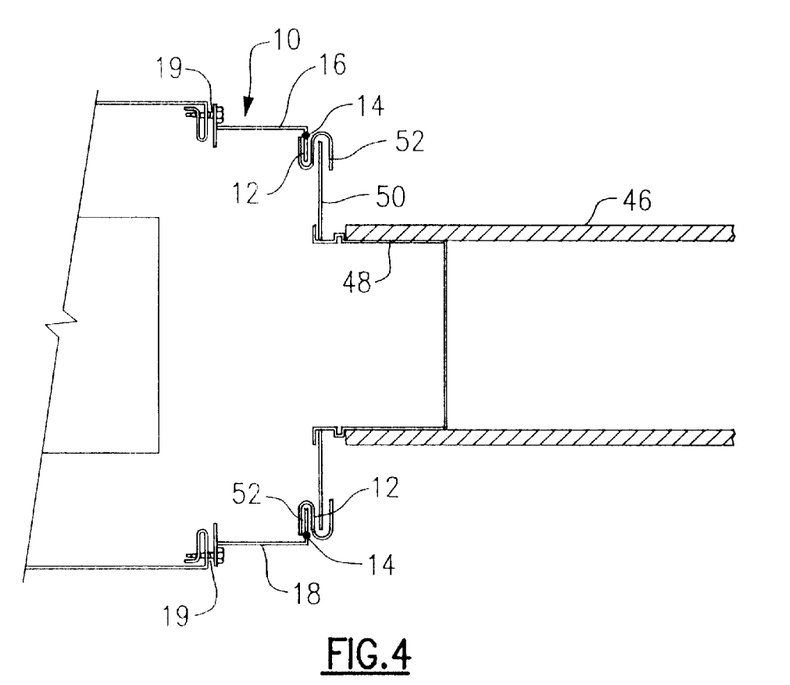
FIG. 4 shows a partial sectional view of a connection between the media cabinet of FIG. 1 and a flex duct used for a bottom return.

Referring to FIG. 4, an example of the ease of installation of media cabinet 10 is depicted with cabinet 10 shown as part of a horizontal furnace installation. A flex duct 46 is shown as a bottom return connected to media cabinet 10. Flex duct 46 includes a take-off boot 48 which is attached to a hole in field supply plate 50. Plate 50 is preferably attached to flange 12 via "S" clips 52.

Figure 5:
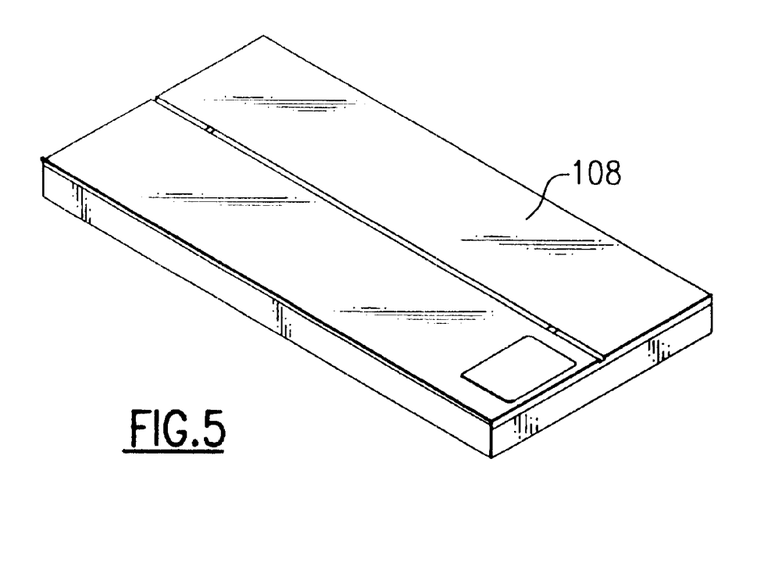
FIG. 5 shows a closed carton containing a kit form of an embodiment of the present invention.
Figure 6:
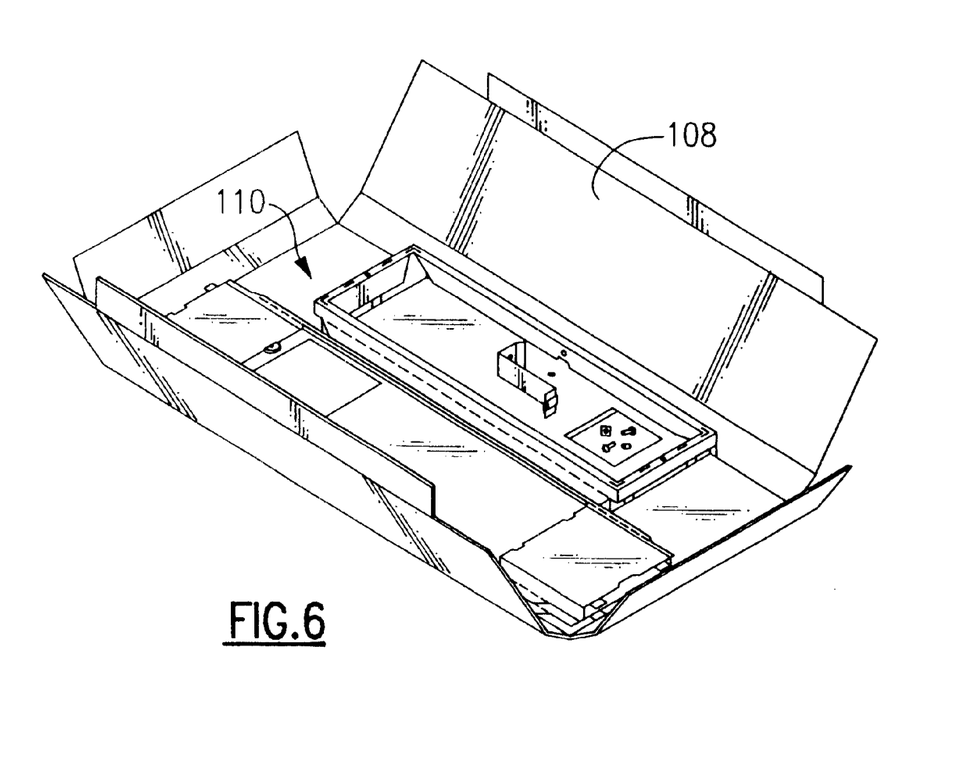
FIG. 6 shows the carton of FIG. 5 open with the kit form of the present invention nested therein.

Referring to FIGS. 5–14, an alternate embodiment of the invention is shown. In FIGS. 5–6, a media filter cabinet 110 is shown in disassembled form packed in a carton 108. The component pieces of media filter cabinet 110 are nested inside carton 108.

Figure 7:
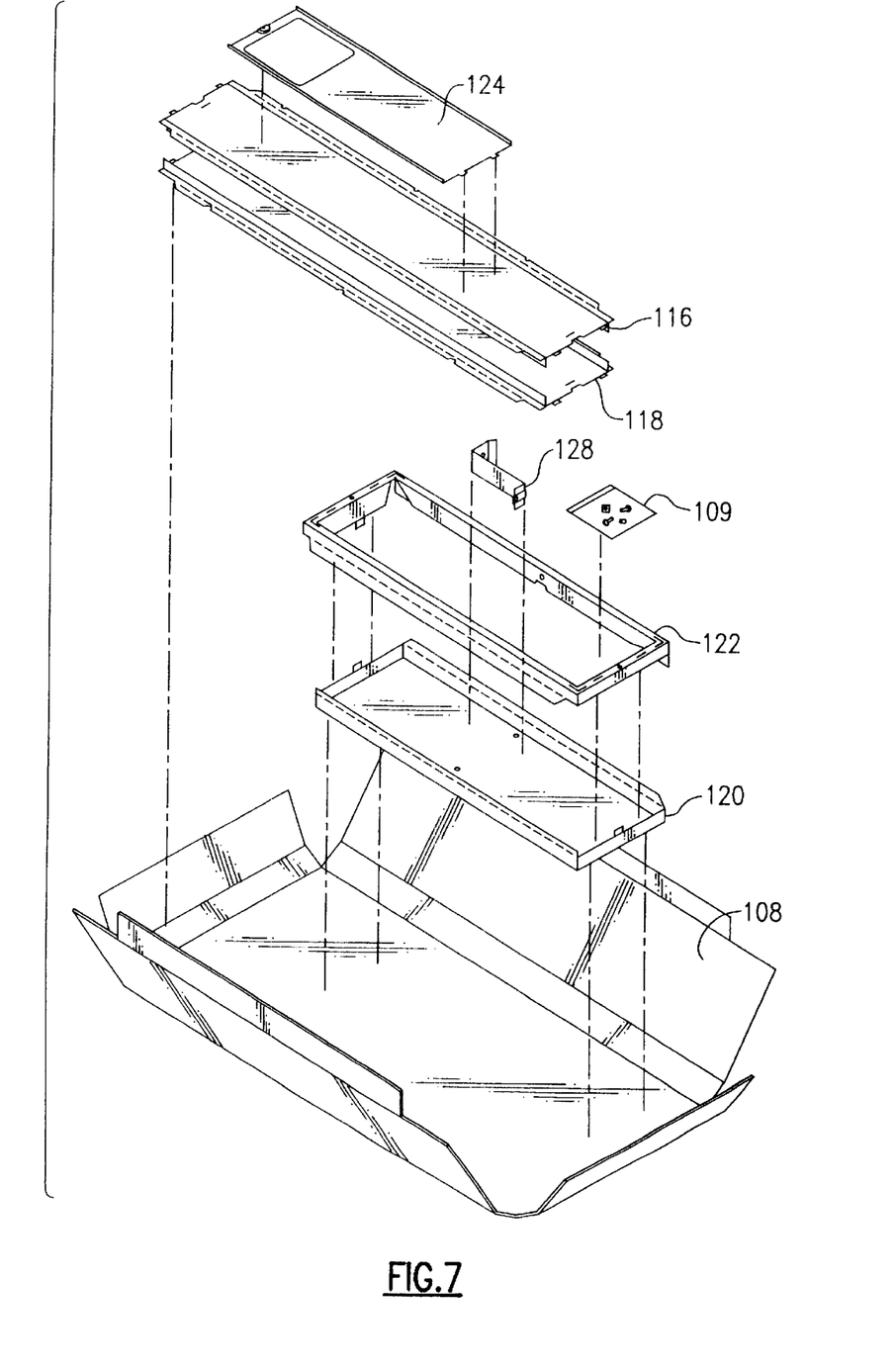
FIG. 7 shows the parts of the kit form of the present invention.

Referring to FIG. 7, the arrangement of the nested pieces is shown. On one side of carton 108, a door 124 is nested inside a top piece 116 which in turn is nested inside a bottom piece 118. Adjacent these nested pieces on the other side of carton 108, a front piece 122 is nested inside a back piece 120. A bracket 128 and a small parts bag 109 are nested inside the nested combination of pieces 122, 120.

Figure 8:
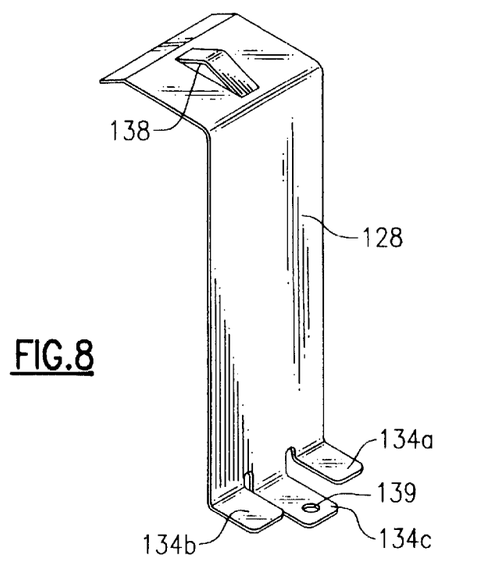
FIG. 8 shows an embodiment of a bracket used with the kit form of the present invention.

Referring to FIG. 8, bracket 128 includes a slot 138 that receives a filter wire 30 (FIG. 1) which comes with the furnace being installed. Two outside flanges 134a, 134b are co-planar, with a center flange 134c in a plane offset from the plane of flanges 134a, 134b. Flanges 134a, 134b, 134c fit over one of the flanges on front piece 122 after cabinet 110 is assembled. Center flange 134c preferably has a hole 139 formed in it for affixing bracket 128 to front piece 122. As depicted here, bracket 128 is approximately 4 inches long, so with bracket 128 installed, a 1 inch filter is retained in cabinet 110. Without bracket 128 installed, cabinet 110 fits a 5 inch media filter. Bracket 128 is optionally made in other sizes to accommodate other sized filters.

Figure 9:
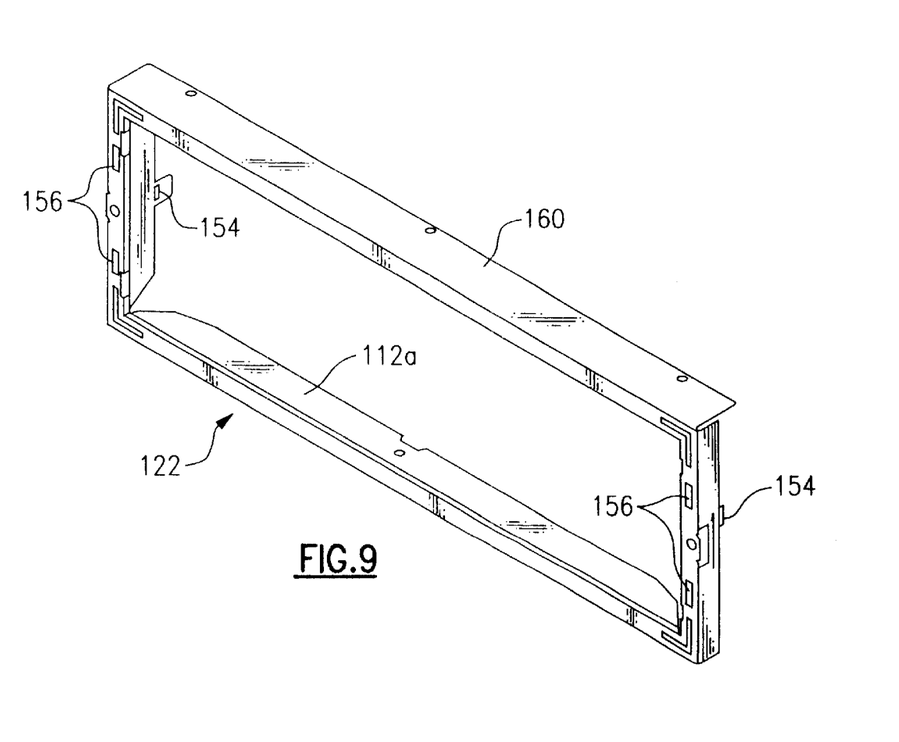
FIG. 9 shows an embodiment of a front piece of the kit form of the present invention.

Referring to FIG. 9, front piece 122 includes a duct flange 112a, a furnace casing flange 160, a plurality of assembly tabs 154, and a plurality of assembly slots 156. The function of these elements will be explained below.

Figures 10A, 10B:
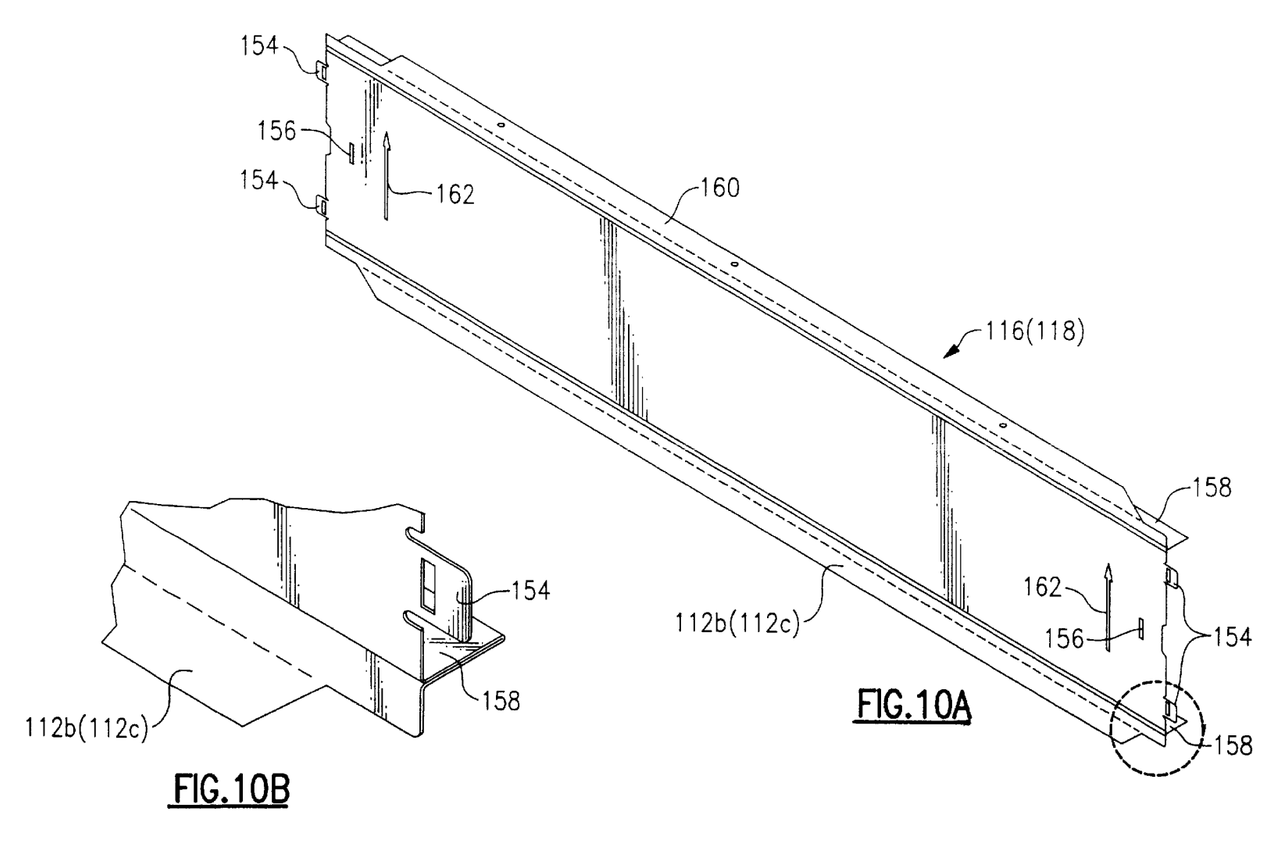
FIG. 10A shows an interchangeable embodiment of top and bottom pieces of the kit form of the present invention.
FIG. 10B shows a blowup of a portion of the interchangeable embodiment of FIG. 10A.

Referring to FIGS. 10A–10B, top piece 116 and bottom piece 118 are identical. Piece 116 (118) includes a duct flange 112b (112c), a furnace casing flange 160, a plurality of assembly slots 156, and a plurality of assembly tabs 154. A pair of parallel filter guide rails 158 hold the largest-sized filter in place. Airflow direction arrows 162 indicate the direction of desired airflow after assembly.

Figure 11:
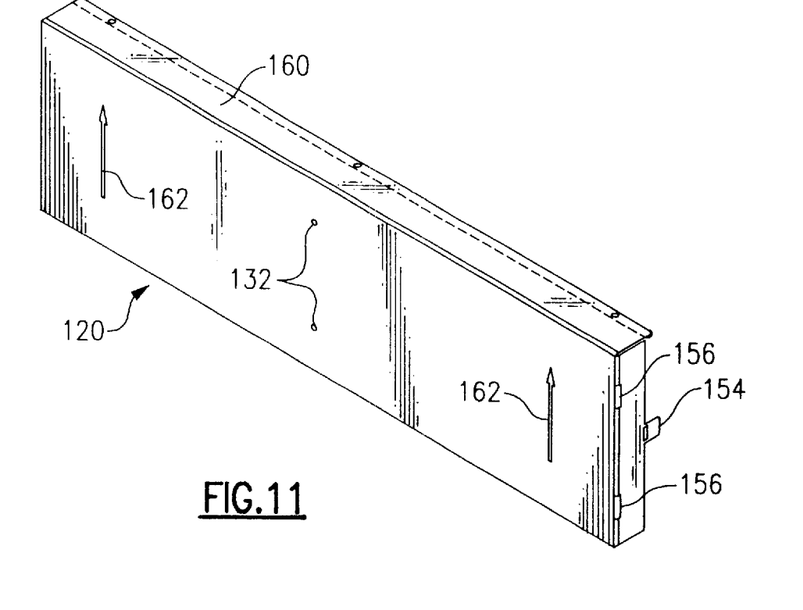
FIG. 11 shows an embodiment of a back piece of the kit form of the present invention.

Referring to FIG. 11, back piece 120 includes a furnace casing flange 160, a duct flange 112d (FIG. 13), a plurality of assembly slots 156, and a plurality of assembly tabs 154. A pair of dimples 132 indicate a location for drilling a hole for receiving the filter wire (wire 30 shown in the previous embodiment). Airflow direction arrows 162 indicate the direction of desired airflow after assembly.

Figure 12:
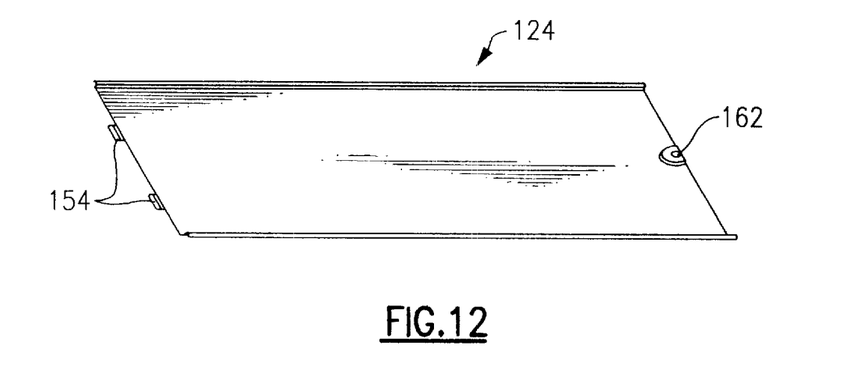
FIG. 12 shows an embodiment of a door of the kit form of the present invention.

Referring to FIG. 12, door 124 includes a plurality of assembly tabs 154 and a screw hole 163.

Figure 13:
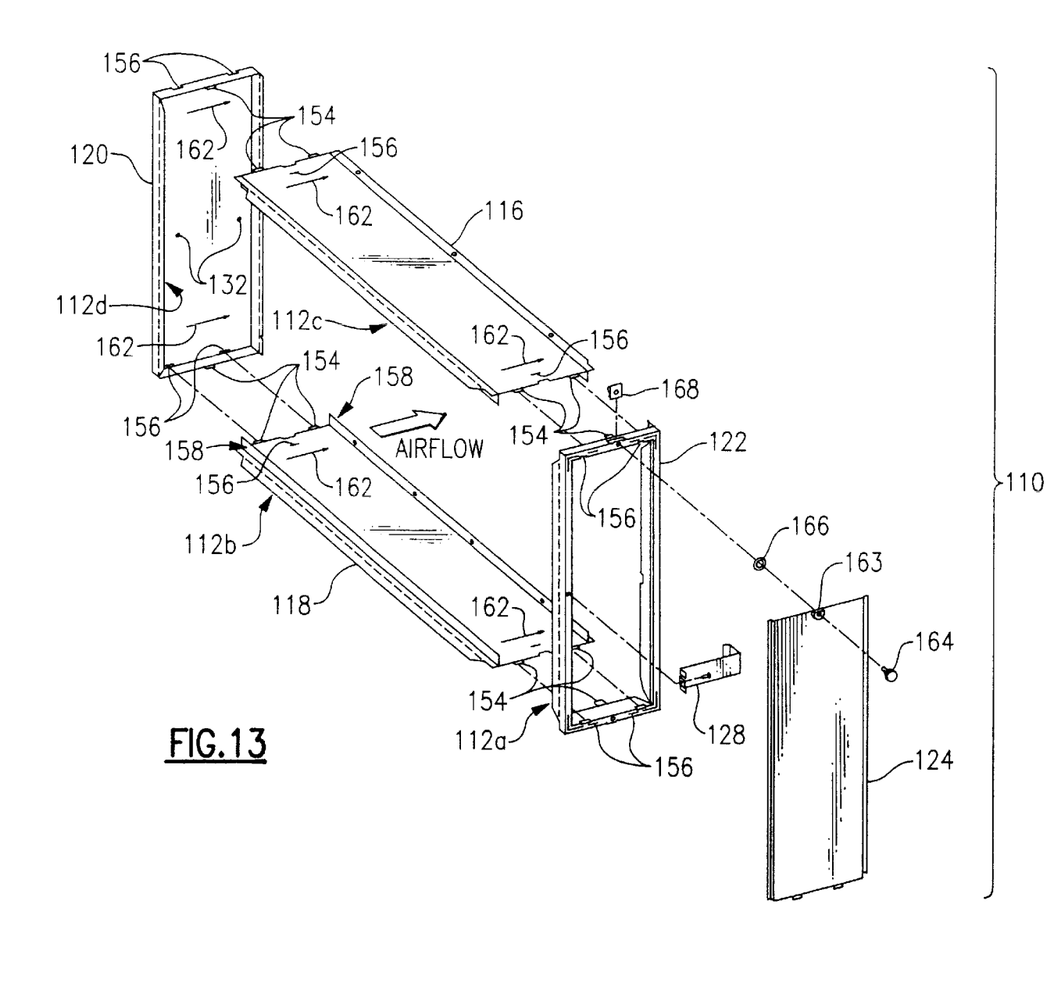
FIG. 13 shows an unassembled embodiment of the kit form of the present invention.
Figure 14:
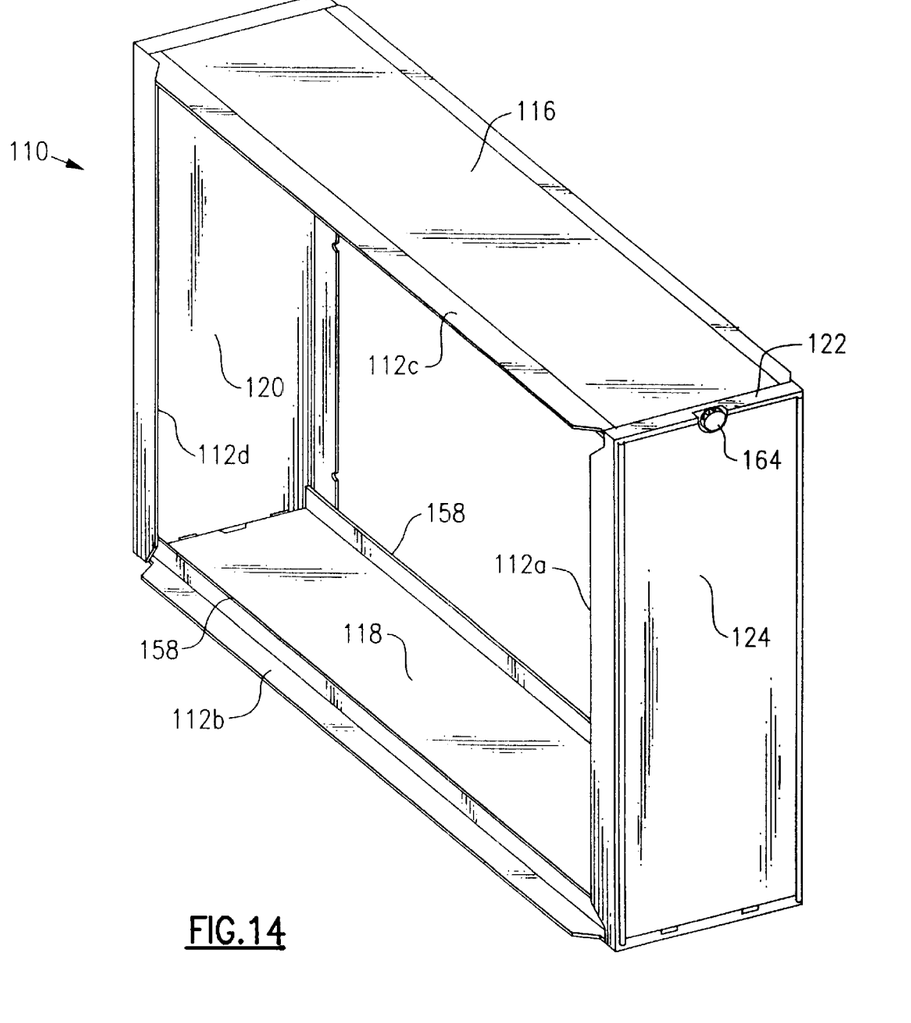
FIG. 14 shows an assembled embodiment of the kit form of the present invention.
Figure 15A:
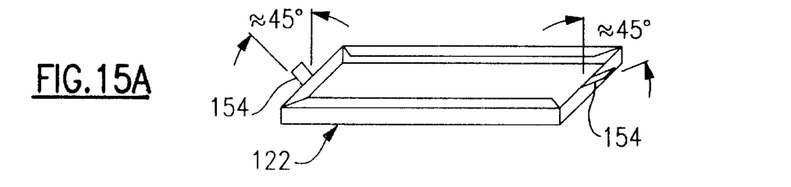
FIG. 15A shows an embodiment of the front piece of the kit form of the present invention during the assembly process.
Figure 15B:
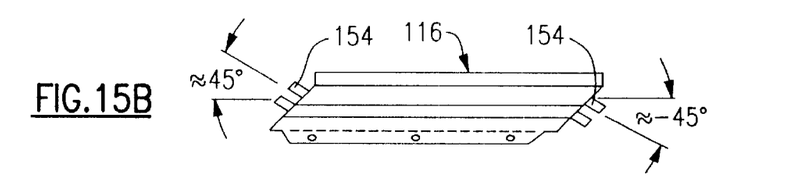
FIG. 15B shows an embodiment of the top (bottom) piece of the kit form of the present invention during the assembly process.
Figure 15C:
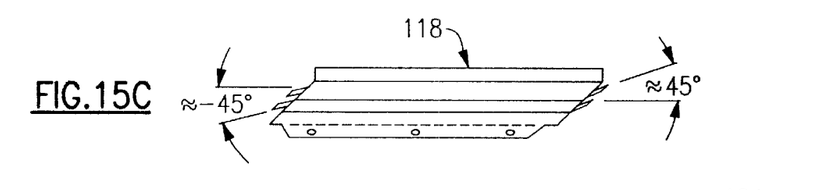
FIG. 15C shows an embodiment of the bottom (top) piece of the kit form of the present invention during the assembly process.
Figure 16:
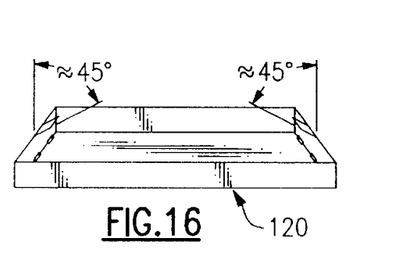
FIG. 16 shows an embodiment of the back piece of the kit form of the present invention during the assembly process.

Referring to FIGS. 13–18, the assembly of cabinet 110 is now explained. FIG. 13 shows all the component pieces of cabinet 110. FIG. 14 shows an assembled cabinet 110. As shown in FIG. 15A, pre-bend tabs 154 of front piece 122 from vertical to approximately 45 degrees out. As shown in FIGS. 15B–15C, pre-bend tabs 154 of top and bottom pieces 116, 118 from in-line with the piece to approximately 45 degrees out. On one of the top or bottom pieces 116, 118, bend the tabs 154 on one end in the opposite direction from the other end. Reverse this on the other piece. As shown in FIG. 16, pre-bend tabs 154 of back piece 120 inward to approximately 45 degrees. The pieces are now ready for assembly.

Figure 17:
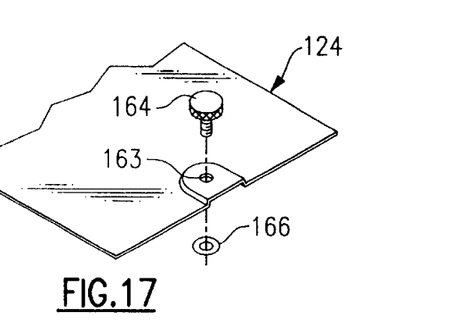
FIG. 17 shows part of means for fastening an embodiment of a door of the kit form of the present invention to the front piece.
Figure 18:
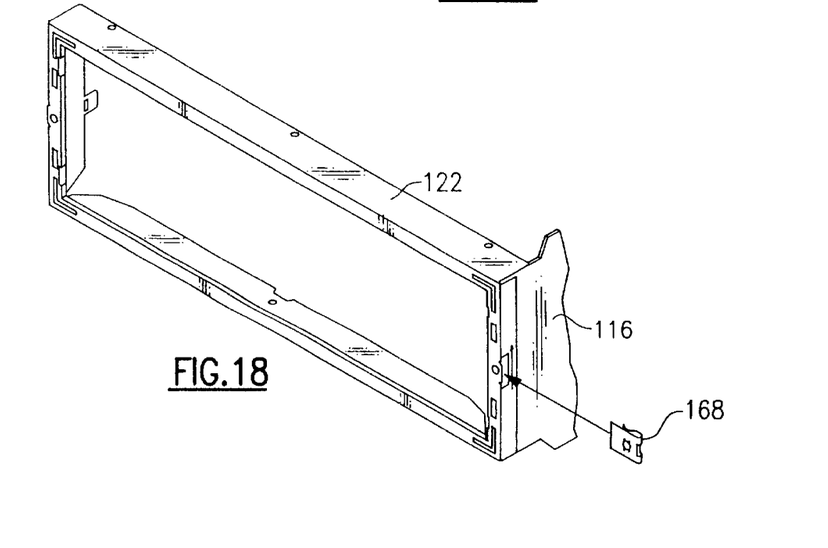
FIG. 18 shows part of the means for fastening an embodiment of the door of the kit form of the present invention to the front piece.

Referring back to FIG. 13, choose either top or bottom piece 116, 118 and insert its assembly tabs 154 into assembly slots 156 on front piece 122, while simultaneously inserting assembly tab 154 of front piece 122 into the top or bottom piece 116, 118 chosen. Ensure that airflow direction arrows 162 of the different pieces are aligned in the same direction. Continue bending tabs 154 over from their pre-bent position until they are flattened against the mating part. Proceed likewise with the other top or bottom piece 116, 118. In like fashion, attach back piece 120 to top and bottom pieces 116, 118, and lock tabs 154 by bending them flat against the mating part. As shown in FIG. 17, place a fastener such as a thumbscrew 164 through hole 163 on door 124 and attach a retaining washer 166 to thumbscrew 164. As shown in FIG. 18, place a speed nut 168 on top piece 116.

Referring back to FIGS. 8 and 13, bracket 128 is attached to front piece 122 on the appropriate side. The appropriate dimple 132 is drilled out to receive wire 30 (FIG. 1) Wire 30 is cut to the right length, with the cut end preferably inserted through the drilled dimple 132. The other end is inserted into slot 138 of bracket 128. The 1 inch filter then fits in the space provided by the bracket-wire assembly.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A media filter cabinet kit, comprising:
   a front piece, said front piece including a plurality of slots and a plurality of tabs;
   a top piece, said top piece including a plurality of slots and a plurality of tabs, wherein said plurality of tabs of said top piece are fittable within said plurality of slots in said front piece and said plurality of tabs in said front piece are fittable within said plurality of slots in said top piece;
   a back piece, said back piece including a plurality of slots and a plurality of tabs, wherein said plurality of tabs of said back piece are fittable within said plurality of slots in said top piece and said plurality of tabs in said top piece are fittable within said plurality of slots in said back piece; and
   a bottom piece, said bottom piece including a plurality of slots and a plurality of tabs, wherein said plurality of tabs of said bottom piece are fittable within said plurality of slots in said front piece and said back piece, and said plurality of tabs in said front and back pieces are fittable within said plurality of slots in said bottom piece;
   wherein said front piece, said top piece, said bottom piece, and said back piece each include a perforated duct flange to permit ease of installation.

2. A media filter cabinet kit, according to claim 1, further comprising
   bracket connectable to said front piece.

3. A media filter cabinet kit according to claim 1, further comprising a door connectable to said front piece.

4. A media filter cabinet kit according to claim 1, wherein said front piece, said top piece, and said bottom piece include an airflow direction marking.

5. A media filter cabinet kit according to claim 1, wherein said top piece and said bottom piece are interchangeable.

6. A media filter cabinet kit according to claim 5, wherein one of said top piece and said bottom piece nest within another of said top piece and said bottom piece inside a carton, and said front piece nests within said back piece inside said carton.

7. A media filter cabinet kit according to claim 6, further comprising a door connectable to said front piece, wherein said door nests within said front piece inside said carton.

8. A media filter cabinet for a furnace, comprising:
   a bottom side connected at a first end to a back side which in turn is connected to a top side;
   first and second front supports connecting a second end of said bottom side to said top side;
   a right side connecting to said top side, said bottom side, said back side, and said first front support;
   a left side connecting to said top side, said bottom side, said back side, and said second front support;
   said right side having an opening therein defined by a duct flange;
   said left side having an opening therein;
   retaining means for retaining a first size filter in said cabinet;
   a width of said cabinet being sized to fit a high-efficiency media filter; and
   a distance between said retaining means and said left side of said cabinet being sized to fit a standard filter;
   wherein said first size filter is smaller in width than said media filter; and
   wherein said duct flange is perforated to permit ease of installation.

9. A media filter cabinet for a furnace, comprising:
   a bottom side connected at a first end to a back side which in turn is connected to a top side;
   first and second front supports connecting a second end of said bottom side to said top side;
   a right side connecting to said top side, said bottom side, said back side, and said first front support;
   a left side connecting to said top side, said bottom side, said back side, and said second front support;
   said right side having an opening therein defined by a duct flange;
   said left side having an opening therein;
   retaining means for retaining a first size filter in said cabinet;
   a width of said cabinet being sized to fit a high-efficiency media filter; and
   a distance between said retaining means and said left side of said cabinet being sized to fit a standard filter;
   wherein said first size filter is smaller in width than said media filter; and
   wherein said retaining means includes:
      a stand-off bracket removably attached to said first front support; and
      a wire connected at a first end to said stand-off bracket and at a second end to a hole in said back side of said cabinet.

10. A media filter cabinet according to claim 9, wherein said back side is removable from said cabinet.

11. A media filter cabinet according to claim 9, wherein said width of said cabinet is approximately five inches; and said distance between said retaining means and said left side of said cabinet is approximately one inch.

12. A media filter cabinet according to claim 9, further comprising a door removably connected across said two front supports.

* * * * *